United States Patent [19]
Nishimura

[11] Patent Number: 5,816,640
[45] Date of Patent: Oct. 6, 1998

[54] CLOSURE APPARATUS BETWEEN PASSENGER COMPARTMENT AND TRUNK OF VEHICLE

[75] Inventor: Kazuhisa Nishimura, Wako, Japan

[73] Assignee: Honda Giken Kogyo Kabushiki Kaisha, Tokyo, Japan

[21] Appl. No.: 571,216

[22] Filed: Dec. 12, 1995

[30] Foreign Application Priority Data

Oct. 19, 1909 [JP] Japan ..................................... 7-271603
Dec. 12, 1994 [JP] Japan ..................................... 6-308020

[51] Int. Cl.⁶ ....................................................... B60R 5/00
[52] U.S. Cl. ........................................ 296/37.8; 269/37.16
[58] Field of Search ................................ 296/37.1, 37.8, 296/37.16

[56] References Cited

U.S. PATENT DOCUMENTS 5,628,513  5/1997  Filipovich et al. ................. 296/37.1 X
5,632,520  5/1997  Butz .................................. 296/37.16 X

FOREIGN PATENT DOCUMENTS 3419758  11/1985  Germany .............................. 296/37.1
3447323   6/1986  Germany ............................. 296/37.16
0193949   8/1986  Japan ................................. 296/37.16
438052   11/1967  Switzerland .......................... 296/37.1

*Primary Examiner*—Joseph D. Pape
*Attorney, Agent, or Firm*—Merchant, Gould, Smith, Edell, Welter & Schmidt, P.A.

[57] ABSTRACT

Closure apparatus of a vehicle includes a passenger compartment side push knob capable of being locked and unlocked by a locking mechanism. When the locking mechanism is unlocked, the push knob is put in an actuatable condition in which the push knob can be lowered by depressing it with a finger. In conjunction with the downward movement of the push knob, a trunk side push knob moves downward to unlock the lid. The lid is pulled down toward the passenger compartment side whereupon the passenger compartment and the trunk area communicate with each other. The trunk side push knob can be depressed without regard to the locked and unlocked conditions of the locking mechanism. When this push knob is depressed, the lid is unlocked and hence can be pulled down toward the passenger compartment side for making a communication between the passenger compartment and the trunk area.

9 Claims, 14 Drawing Sheets

CLOSURE APPARATUS BETWEEN PASSENGER COMPARTMENT AND TRUNK OF VEHICLE

BACKGROUND OF THE INVENTION

1. Field of the Invention

The present invention relates to a closure apparatus having a closure member for making and blocking communication between the passenger compartment and the trunk area of a vehicle.

2. Description of the Related Art

Vehicles of the type having a trunk-through passageway have been put into practice in which the passenger compartment and the trunk area communicate with each other when a closure apparatus disposed between them is opened.

This type of vehicle may encounter an accident wherein a third person enters the passenger compartment by breaking a window or a door, and steals goods or articles from the trunk area by opening the closure apparatus.

In order to improve antitheft security with respect to the articles held in the trunk area, it has been a customary practice to provide a lock on the closure apparatus provided for making and blocking communication between the passenger compartment and the trunk area, i.e., an armrest lid or a seat back which is capable of forming a trunk-through passageway structure.

One example of the trunk-through passageway structure used heretofore includes a communication hole or opening provided behind an armrest disposed at a central portion of the rear seat of a vehicle, and a closure apparatus composed of a lockable lid for opening and closing the communication opening such that the passenger compartment and the trunk area communicate with each other when the lid is open.

FIG. 15 shows one example of such prior trunk-through passageway structure detailed below. An armrest 104 capable of being placed up and down is disposed at a central portion between left and right seat backs 101, 101 of the rear seat 100 of a vehicle. In FIG. 15 the armrest 104 is shown in a recumbent position lying flat over a central portion of the seat cushion 103. Between the seat backs 101, 101, there is provided an armrest receiving recess 102 into which the armrest 104 is received when it is tipped up from the recumbent position to the upright position.

The armrest receiving recess 102 has formed therein a communication hole or opening through which a passenger compartment and a trunk area communicate with each other. The communication opening can be opened and closed by a lid 105 which forms a closure apparatus, the communication opening being normally closed by the lid 105.

The lid 105 is provided with a slide knob 106 interlocked with a locking prong (not shown), and a lock 107 for releasably locking or fastening the lid 105.

When the lock 107 is unlocked by a key, the prior art closure member or lid 105 is put into an unlocked or released condition in which the slide knob 106 is slidably movable. The slide knob 106 is then slid to move the locking prong in a direction to unlock or release the lid 105, and while keeping this condition, the lid 105 is rotated down to open the communication opening.

Now the passenger compartment and the trunk area communicate with each other via the communication opening so that a long article can be received in such a way as to allow it to extend from the trunk area to the passenger compartment through the communication opening.

The lid 105 has a size of about 150–200 mm in width and about 200–300 mm in height and the shape of the lid 105 is a substantially rectangular plate. Hereinafter will be described the procedure to be taken to complete the trunk-through opening between the passenger compartment and the trunk area to receive the long article. Since the lid 105 is locked, the lock 107 of lid 105 is unlocked from the interior of the passenger compartment. Then the slide knob 106 is pulled downward and lid 105 is put into the unlocked condition.

Thereafter, the operator goes out of the passenger compartment, and walks around to the rear of the vehicle body, opens a trunk lid, and places the long article into the trunk area.

In the case where the operator is the driver, the driver needs to first get out of the driver's seat, open a rear door, enter the back of the passenger compartment, and finally unlock the lock 107.

As discussed above, in order to make a communication between the passenger compartment and the trunk area, lid 105 requires unlocking from the interior of the passenger compartment before it is opened. Thus, the lid-opening operation is tedious and complicated as a whole.

Furthermore, if the lid 105 is unlocked but inadvertently left unopened, the operator standing behind the trunk area needs to first go back into the passenger compartment, open the lid 105, get out of the passenger compartment again, and walk around to a position behind the trunk area. Such a sequence of operations lowers labor efficiency.

It may also occur that the operator, while attempting to place an article in the trunk area finds it impossible to do so due to the length of the article being slightly greater than the width of the trunk area. In this instance, it is unavoidable for the operator to leave the trunk area and go back to the passenger compartment. After the lid 105 is unlocked and opened, the operator must go back to the position behind the trunk area.

It is therefore an object of the present invention to provide a closure apparatus in a vehicle which is capable of being opened to form a trunk-through passageway only when a lock on the closure apparatus is unlocked, wherein the closure apparatus requires an unlocking operation to provide antitheft security when it is opened from the interior of the passenger compartment, but wherein the closure apparatus can be opened from the trunk area side without requiring an unlocking operation from the passenger compartment side. In other words, an object of the present invention is to provide a closure apparatus which is capable of making and blocking a communication between the passenger compartment and the trunk area of a vehicle with improved convenience without depreciating the antitheft security.

SUMMARY OF THE INVENTION

To attain the foregoing object, the present invention of closure apparatus seeks to provide a closure apparatus adapted to be opened and closed for making and blocking communication between the passenger compartment and the trunk area of a vehicle, the closure apparatus comprising: a lock mechanism capable of being locked and unlocked from the passenger compartment side; a passenger compartment side push knob disposed in such a way as to allow it to be actuated from the passenger compartment side and capable of being depressed when the locking mechanism is in its unlocked condition; and a trunk room side pusher knob releasably supported by a support member via a locking engagement between them and movable downward in conjunction with the downward movement of the passenger compartment side knob to disengage the locking engagement between it and the support member, wherein when the trunk area side push knob is depressed from the trunk area side, the locking engagement between the trunk area side push knob and the support member is released to place the closure apparatus in an openable condition regardless of whether the locking mechanism is in its locked or unlocked condition.

In one preferred embodiment, the closure apparatus is adapted to open and close a communication opening between the passenger compartment and the trunk area when a pulldown armrest disposed at a central portion of a rear seat is pulled down to its horizontal recumbent position.

In another preferred embodiment, the closure apparatus is a rear seat back capable of being pulled down or pushed up to make or block communication between the passenger compartment and the trunk area.

BRIEF DESCRIPTION OF THE DRAWINGS

The present invention will be described below in greater detail with reference to the accompanying drawings, in which.

DETAILED DESCRIPTION OF THE INVENTION

FIGS. 1 through 6 show a first embodiment of closure apparatus according to the present invention. In this embodiment, the closure apparatus is comprised of a lid 1 for armrest-through passageway structures (hereinafter referred to as "lid") provided between the passenger compartment and the trunk area of a vehicle.

Figure 1:
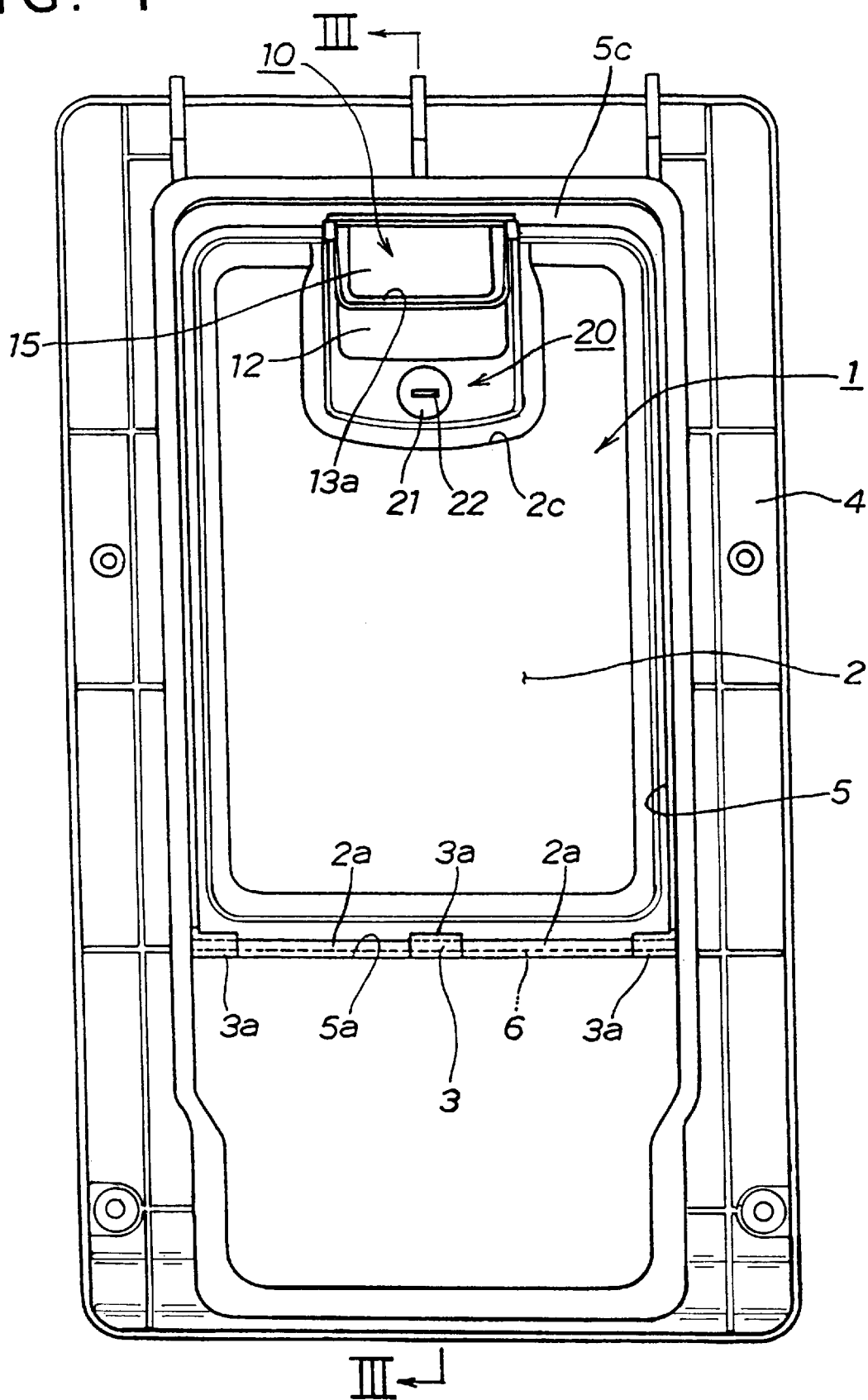
FIG. 1 is a front elevational view of a lid for an armrest-through passageway according to a first embodiment of a closure apparatus of the present invention.
Figure 2:
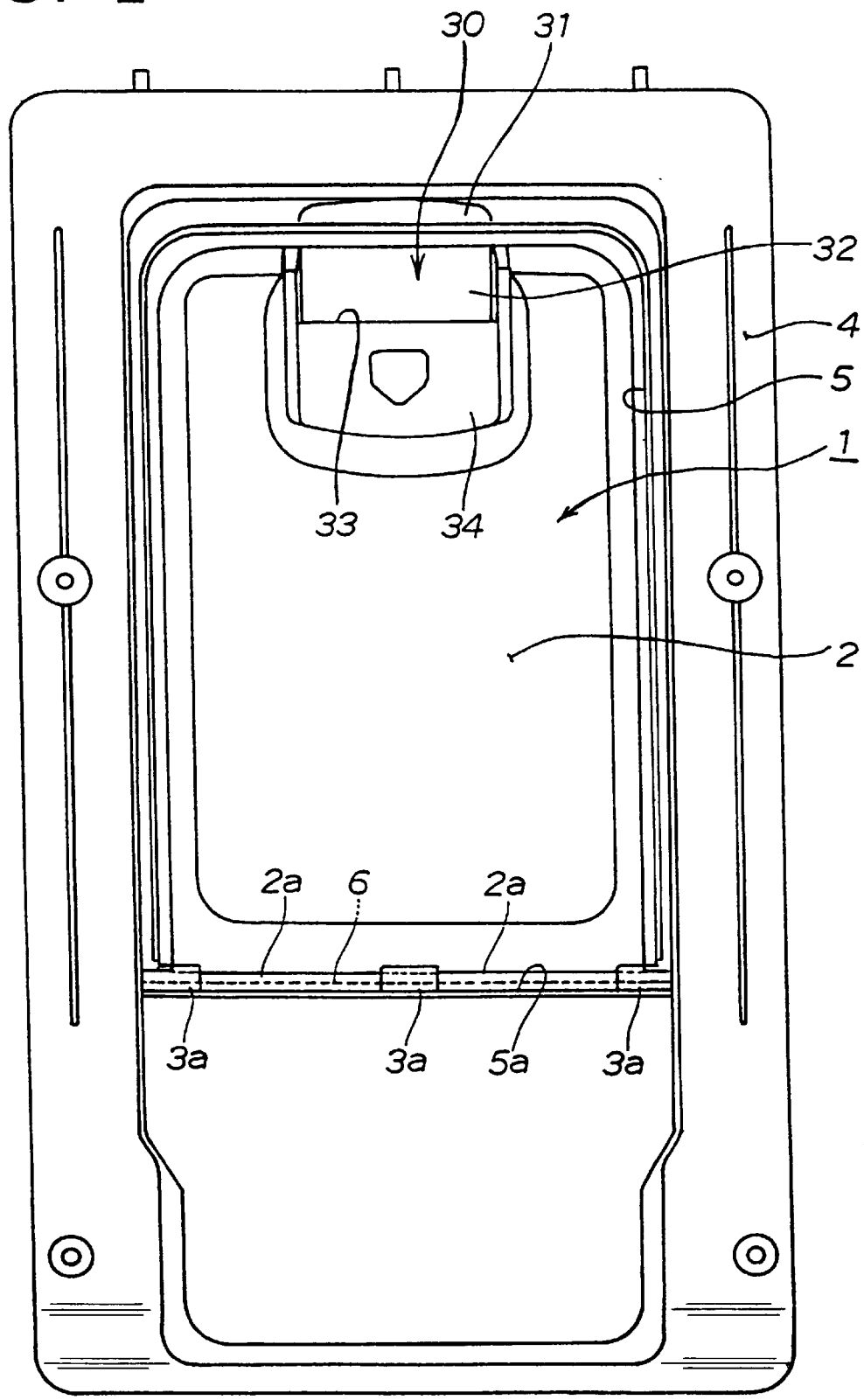
FIG. 2 is a rear view of the lid for the armrest-through passageway.

As shown in FIGS. 1 and 2, the lid 1 has a vertically elongated rectangular plate-like shape as viewed from the front or the rear side thereof. The lid 1 is attached to a frame 4 in such a manner that the lid 1 releasably fits with a vertically elongated rectangular opening 5 extending over the upper portion of the lower half and most of the upper half of the frame 4 which has a vertically elongated rectangular plate-like shape as viewed from the front or the rear side thereof.

The opening 5 forms a communication hole or opening communicating between the passenger compartment and the trunk area.

The lid 1 has a plate-like body 2 connected at its lower end to a lower edge 5a of the opening 5 in the frame 4 by means of a hinge 3 so that the lid 1 can be opened and closed by turning it about the hinge 3. The lid body 2 has a locking mechanism 20, described later, disposed on a widthwise central portion of an upper end thereof and a first slide knob 10 constituting an actuation mechanism operative to achieve an opening operation of the lid body 2.

In FIGS. 1 and 2, the lid 1 is shown in its closed condition or position, but lid 1 is attached to the frame 4 in such a way as to open and close the opening 5.

In this embodiment, the lower edge 5a of the opening 5 is provided with three laterally spaced bosses 3a, 3a, 3a, as shown in FIGS. 1 and 2. The lower end of the lid body 2 is provided with two laterally spaced projections 2a, each received between two adjacent ones of the bosses 3a. The lid 1 is pivotally connected to the lower edge 5a of the opening 5 by a pin 6 extending horizontally through the bosses 3a and the projections 2a.

FIG. 1 is a front elevational view of the lid body 2 as viewed from the interior of the passenger compartment. The lid body 2 has on its passenger compartment side the aforesaid first slide knob 10. FIG. 2 shows the lid body 2 as viewed from the trunk area side and, as is apparent from FIG. 2, the lid body 2 has at its upper portion a second slide knob 30.

The locking mechanism and the slide knob actuation mechanism will be described in greater detail.

Figure 3:
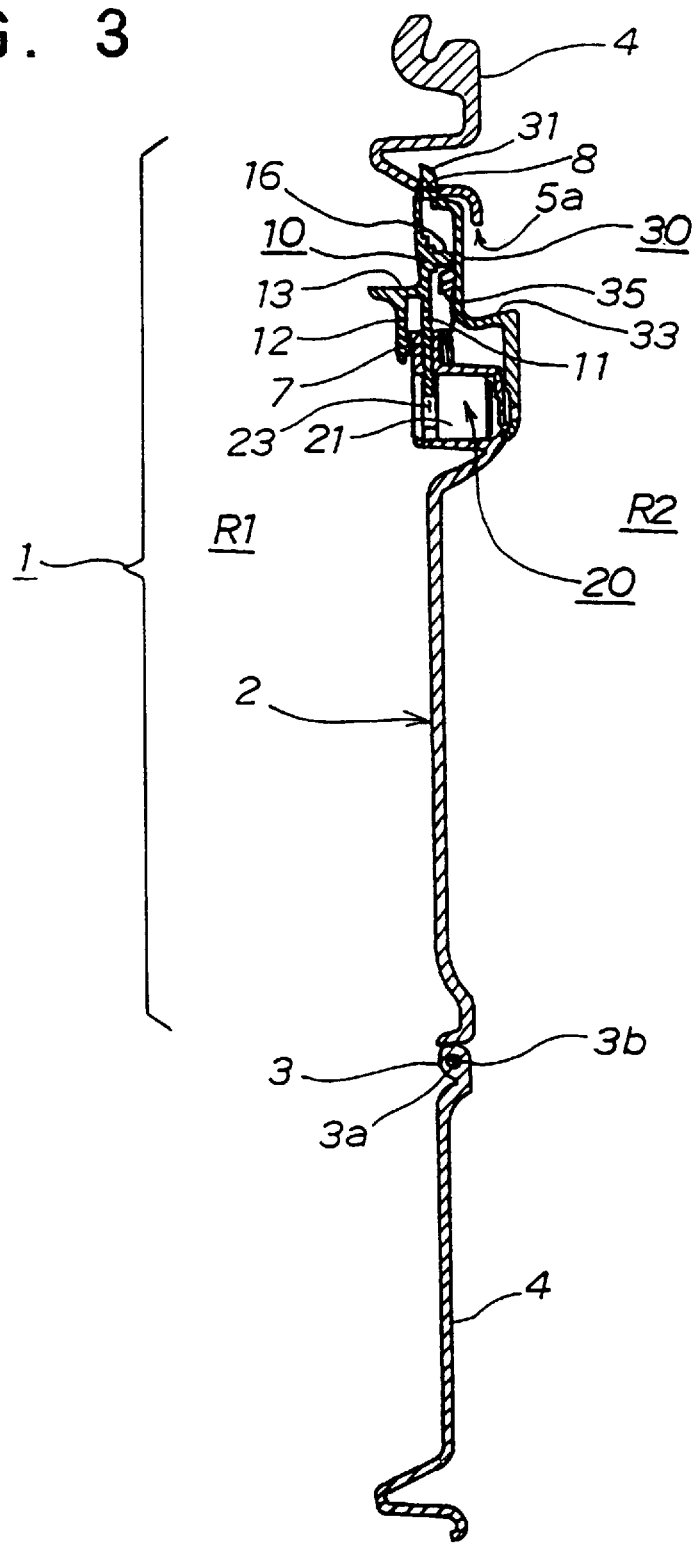
FIG. 3 is a cross-sectional view taken along line III—III of FIG. 1.
Figure 4:
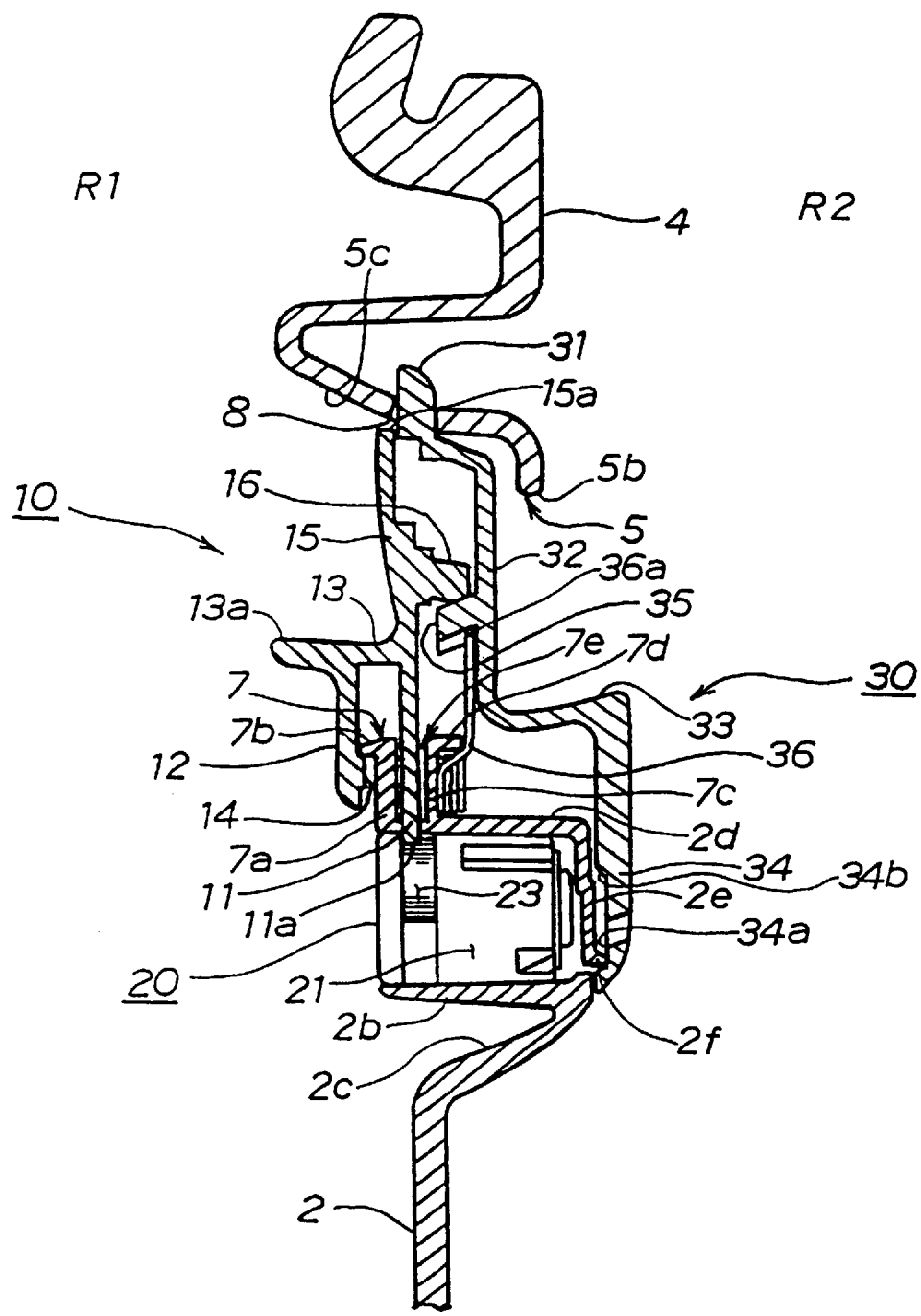
FIG. 4 is an enlarged view of a main portion of FIG. 3, showing in cross section a locking and unlocking portion and a lid-opening actuating portion, with the lid shown in a locked and closed condition.

As shown in FIGS. 3 and 4, the locking mechanism 20 is disposed at a central portion of the upper end of the lid body 2 and faces toward the interior of the passenger compartment. In FIG. 4 the locking mechanism 20 has a body composed of a rotary cylinder lock 21 rotatably fitted in a substantially cylindrical casing 2b closed at its bottom end by a wall 2e. The cylinder lock 21 has a keyhole 22 extending from the face to the back of the lock cylinder and facing the interior of the passenger compartment, as shown in FIG. 1.

The cylindrical casing 2b, holding therein the locking mechanism 20, is formed integrally with a recessed portion 2c at an upper central portion of the lid body 2 such that a front end face of the casing 2b does not project too much from a front surface of the lid body 2.

The cylindrical casing 2b of the locking mechanism 20 includes an upper casing portion 2d having at its front end a branched or bifurcated upwardly open knob retainer 7. The bifurcated knob retainer 7 has a front retainer piece 7a including a locking portion 7b projecting forwardly from an upper end thereof, and a rear retainer piece 7c including a retaining portion 7d projecting rearwardly from an upper end thereof.

The front and rear pieces 7a and 7b of the knob retainer 7 define therebetween a vertical slit 7e.

The first slide knob 10 is disposed on the interior side of the passenger compartment and located above the locking mechanism 20 at the upper central portion of the lid body 2.

The lid body 2 has an upper end facing an upper peripheral edge 5b of the opening 5 of the frame 4. The frame 4 has a vertical locking hole 8 positioned directly above the locking mechanism 20. Interlocked with this locking hole 8 is a locking portion 31 of the second slide knob 30 of the trunk area side to lock the lid body 2 in position to keep the lid 1 in a closed condition.

The first slide knob 10 will be described below in further detail.

The first slide knob 10 includes a rear leg piece 11 slidably fitted in a slit 7e of the knob retainer 7 from above, and a front leg piece 12 spaced forwardly from the rear leg piece 11. The front and rear leg pieces 12 and 11 are formed integrally with a horizontal bridge piece 13 interconnecting upper ends of the leg pieces 12, 11, the bridge piece 13 forming a horizontal pusher actuating piece. The bridge piece 13 slightly projects into the interior of the passenger compartment, and this projecting portion of the bridge piece 13 has a pusher portion 13a on its upper surface.

The front leg piece 12 has a stopper 14 projecting from a lower portion of the rear surface thereof. The stopper 14, in the locked condition shown in FIG. 4, is engaged with the locking portion 7b of the front piece 7a of the knob retainer 7 to prevent an upward movement of the first slide knob 10.

The bridge piece 13 is formed integrally with an upwardly extending cover piece or strip 15. The cover strip 15 has an upper end located immediately below the locking hole 8 formed in a front edge portion 5c extending forwardly from the upper edge 5b of the opening 5.

The cover strip 15 has a locking projection 16 projecting from an intermediate portion adjacent to a lower end of the rear surface of the cover strip 15. The locking projection 16 serves to lower the second slide knob 30 in conjunction or association with a downward movement of the first slide knob 10 and also to prevent an upward movement of the second slide knob 30.

The second slide knob 30 is located at a central portion of an upper part of the rear surface of lid body 2 and is arranged such that the second slide knob 30 is exposed to the interior of the trunk area at a position behind the locking mechanism 20 and the first slide knob 10. The second slide knob 30 has a substantially inverted Z shape as in the side view and is provided with a locking projection 31 which is engaged in and released from the locking hole 8 in the upper edge portion 5c of the opening 5 of the frame 4 in conjunction with vertical movement of the second slide knob 30.

The locking projection 31 has a lower end integral with the upper end of the upper leg piece 32, said lower end of the locking projection 31 being bent rearward and extending downwardly. The upper leg piece 32 has a lower end formed integrally with a pusher portion 33 slightly projecting into the trunk area, the pusher portion 33 forming a slide actuating portion.

The pusher portion 33 has a rear end formed integrally with a downwardly extending lower leg piece 34. The lower leg piece 34 has a locking recess 34a formed in the front surface at a lower portion thereof. The locking recess 34a confronts the bottom wall 2e of the cylindrical casing 2b and is lockingly engageable with a locking projection 2f projecting rearward from a lower end of the bottom wall 2e, so as to prevent upward movement of the second slide knob 30.

The second slide knob 30 has on its front surface a locking projection 35 which is normally disposed below the locking projection 16 of the first slide knob 10 and held in abutment with a lower surface of the locking projection 16 to lock the second slide knob 30 in position against upward movement.

Disposed on the rear surface of the rear leg piece 7c of the knob retainer 7 is a torsion spring 36 mounted on a projection (not shown), for example, on the rear surface of the rear leg piece 7c and retained from above by the retaining portion 7d of the rear leg piece 7c. The torsion spring 36 has a free end 36a engaged with a lower surface of the locking projection 35 of the second slide knob 30 and resiliently urges the second slide knob 30 upwardly.

Figure 5:
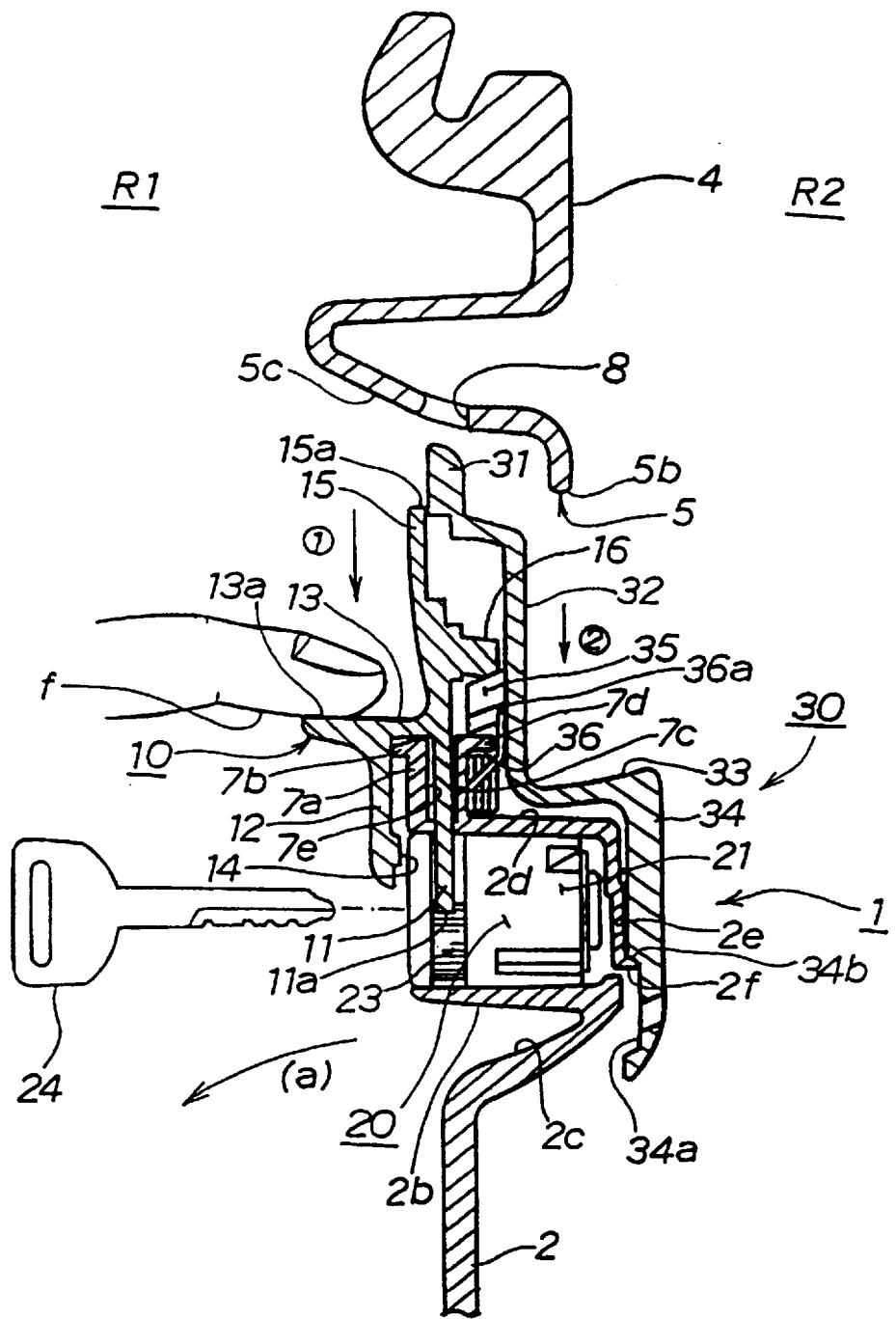
FIG. 5 is a cross-sectional view similar to FIG. 4, illustrative of the manner in which the lid is opened from the interior of the passenger compartment.

In FIGS. 4 and 5, a space extending from the left-hand side of the lid body 2 and the frame 4 is the passenger compartment R1, and a space extending from the right-hand side of the lid body 2 and the frame 4 is the trunk area R2.

The illustrated cylinder lock 21 of the locking mechanism 20 is in the locked condition with its keyhole 22 lying horizontally as shown in FIG. 1. In this locking condition, a locked portion 23 of the cylinder lock 21 is upwardly offset from the center of the cylinder lock 21, and an upper end of the locking portion 23 is in abutment with a lower end 11 a of the rear leg piece 11 of the first slide knob 10 which is inserted downwardly into the slit 7e of the knob retainer 7.

With this arrangement, even when the pusher portion 13a of the first slide knob is depressed or lowered from the passenger compartment R1 side, abutting engagement between the lower end 11a of the rear leg piece 11 and the upper end of the locking portion 23 of the cylinder lock 21 continues to prevent the first slide knob 10 from moving downwardly. This means that while the locking mechanism 20 is in the locking condition, the lid body 2 cannot be opened and continues to close the opening 5, thus blocking communication between the passenger compartment R1 and the trunk area R2.

A sequence of operations taken from the passenger compartment R1 side to release the locked condition and placing the lid body 2 in a condition openable from the passenger compartment R1 side will be described below with reference to FIG. 5.

A key 24 is inserted in the keyhole 22 of the cylinder lock 21 and then turned in one direction through an angle of 180 degrees, for example, so that the locking portion 23 is brought to a position downwardly offset from the center of the cylinder lock 21, as shown in FIG. 5.

As a result of this angular movement of the cylinder lock 21, the locking portion 23 is downwardly separated from the lower end 11a of the rear leg piece 11 of the first slide knob 10. Then the pusher portion 13a is lowered by depressing it with a finger f to lower the first slide knob 10 in the direction of the arrow indicated by encircled numeral 1 shown in FIG. 5.

Since the locking portion 23 of the cylinder lock 21 is displaced downwardly, the rear leg piece 11 of the first slide knob 10 is permitted to move downward. Concurrently with this downward movement of the first slide knob 10, the locking projection 16 moves downward whereupon the locking projection 35, which is disposed below the locking projection 16 and held in interlocking engagement with the locking projection 16, is forced to move in a downward direction against the force of the spring 36.

With this downward movement of the locking projection 35, the second slide knob 30 is lowered in the direction of the arrow indicated by encircled numeral 2 shown in FIG. 5. The locking projection 31 formed at an upper end of the second slide knob 30 is also lowered and eventually retracted from the locking hole 8 in the upper edge portion 5c of the frame 4. The downward movement of the first slide knob 30 is limited when a lower surface of the bridge piece 13 comes into abutment with an upper end of the front piece 7a of the knob retainer 7. At this time, the first slide knob 10 assumes its lowermost position and the locking projection 2f abuts against an upper end 34b of the locking recess 34a in the lower leg piece 34 of the second slide knob 30.

The lid body 2 is thus released from locking engagement with the frame 4. The lid body 2 is now permitted to turn about the hinge 3 (FIG. 3) downward toward the passenger compartment R1 side, as indicated by arrow (a) shown in FIG. 5. As a result of this angular movement of the lid body 2, the opening 5 in the frame 4 located behind the armrest is opened and hence the passenger compartment R1 and the trunk area R2 communicate with each other via the opening 5. As previously described, a long article such as a pair of skis or a fishing rod can be received in such a way as to allow it to extend from the trunk area R2 to the passenger compartment R1 through the opening 5. In this instance, the opening 5 forms a communication opening which completes an armrest-through passageway between the passenger compartment R1 and the trunk area R2.

A sequence of operations taken to open the lid body 2 from the trunk area R2 side will be described below with reference to FIG. 6.

The pusher portion 33 of the second slide knob 30 is lowered by depressing it from the above with a finger f. Since the second slide knob 30 has nothing to do with the locking mechanism 20 and is simply urged upwardly by the resilient force of the spring 36, the second slide knob 30 can be lowered by a downward pressure applied thereto.

Figure 6:
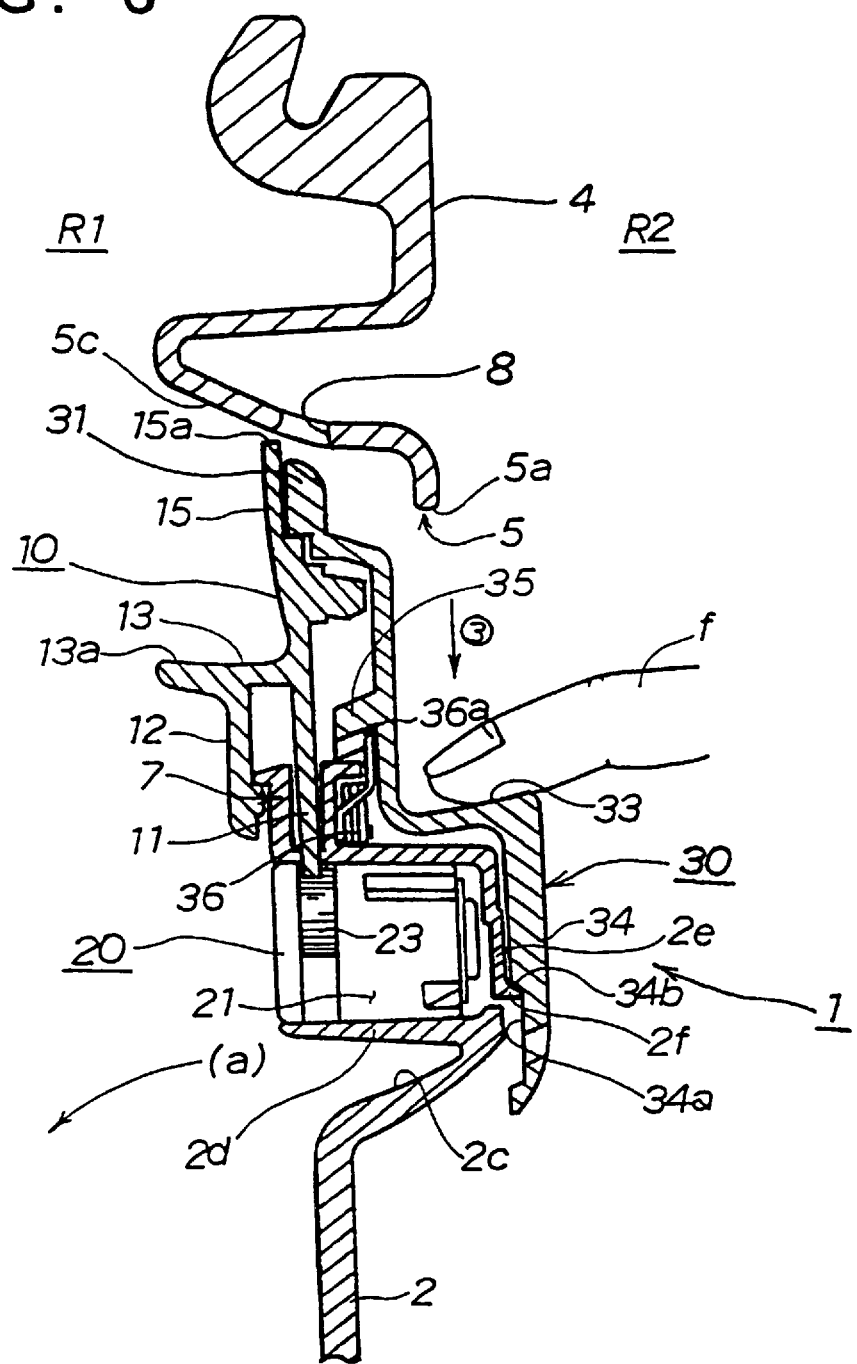
FIG. 6 is a cross-sectional view similar to FIG. 5, showing the manner in which the lid is opened from the interior of the trunk area.

Thus, the second slide knob 30 having no connection with the locking mechanism 20 is lowered against the resilient force of the spring 36 in the direction of the arrow indicated by encircled numeral 3 shown in FIG. 6. The downward movement of the second slide knob 30 causes the locking projection 31 to move downwardly and finally retract the locking projection 31 from the locking hole 8 in the upper edge portion 5c of the opening 5 of the frame 4 in the same manner as described above. The lid body 2 can therefore be opened to the opening 5 of the frame 4.

The downward movement of the second slide knob 30 is limited when the locking projection 31 abuts against an upper surface of the locking projection 16. In this instance, the upper end 34b of the locking recess 34a abuts on the locking projection 2f at the lower end of the bottom wall 2e of the cylindrical casing 2b.

Thus, from the trunk area R2 side, the second slide knob 30 can be lowered only by pushing it downwardly. The operation to unlock the locking mechanism 20 which is required for opening the lid body 2 from the passenger compartment R1 side is not required any more.

After the lock on the lid body 2 is released, the lid body 2 is pulled down forwardly as indicated by arrow (a) shown in FIG. 6 with the result that the opening 5 forming a communication opening in the armrest-through passageway is opened. Now, a long article can be received in the trunk area R2 with part of it projecting through the opening 5 into the passenger compartment R1 in the same manner as described above.

As understood from the foregoing description, from the passenger compartment R1 the opening 5 for an armrest-through passageway can be opened by way of a lid-opening operation which becomes achievable only after the locking mechanism 20 is unlocked. On the other hand, from the trunk area R2 the lid 1 for the armrest-through passageway can be opened without requiring an operation to unlock the locking mechanism 20 on the passenger compartment R1.

Accordingly, even when the lid for the armrest-through passageway is locked, the operator no longer needs to go back from the trunk area site into the passenger compartment to unlock and then open the lid. When the operator, while attempting to place an article in the trunk area, finds it impossible to do so due to the length of this article being slightly longer than the size of the trunk area, an armrest-through passageway is needed. In this case, the operator can make the necessary armrest-through passageway by opening the lid from the trunk area side without going back into the passenger compartment to achieve the same purpose.

Thus, even when the lid for the armrest-through passageway is left unlocked due to oversight of the operator in the passenger compartment, and the operator just finds the unlocked condition of the lid after the trunk area is opened, the operator can lock the lid from the trunk area side.

Due to miscalculation of the size of an article, the operator occasionally finds it impossible to place the article in the trunk area after the trunk is opened. In this instance, the armrest-through passageway lid should be opened to receive the article. The operator is able to meet this requirement by opening the lid from the interior of the trunk area without returning to the passenger compartment to release the locked condition of the lid.

It will be understood that from the passenger compartment, the lid-opening operation is impossible to achieve unless the lock-releasing operation is accomplished in advance. Another person cannot open the lid except if he or she has a key. Conversely, from the trunk area side the lid can be opened at the user's desire regardless of whether the lid is locked or unlocked.

According to the first embodiment of this invention, it is possible to obtain a lid for an armrest-through passageway with greatly improved manipulability when it is opened, is able to preclude the operator from taking unnecessary action, and can be handled with utmost ease.

By virtue of a combination of the first slide knob 10 which is operative under the control of the locking mechanism 20 and operatively interlocked with the second slide knob 30, and the second slide knob 30 which is disposed on the trunk area R2 side and capable of being depressed without regard to the first slide knob 10, the closure apparatus according to the first embodiment is simple in construction and reliable in operation.

In the embodiment detailed above, the frame 4, lid 2, first slide knob 10 in its entirety, and second slide knob 30 in its entirety are all molded with synthetic resin, and the locking mechanism 20 and the spring 30 are made of metal.

FIGS. 7 through 14 show a second embodiment of the closure apparatus according to the present invention.

Figure 7:
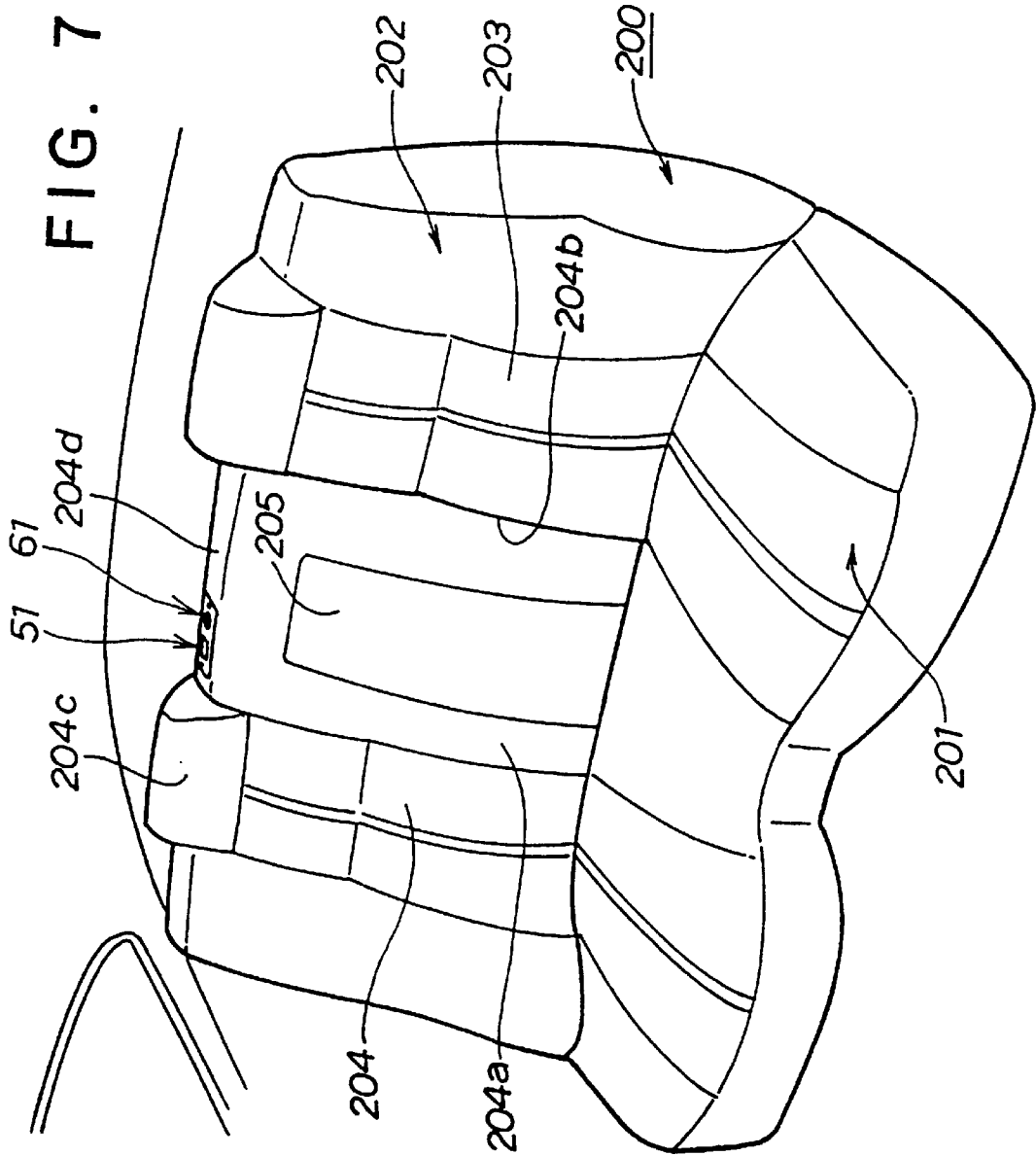
FIG. 7 is a perspective view showing a rear seat including a pulldown rear seat back type closure apparatus according to a second embodiment of the closure apparatus of this invention.

In this embodiment, a rear seat 200 constitutes a closure apparatus. As shown in FIG. 7, the rear seat 200 is composed of a seat cushion 201 and a seat back 202. The seat back 202 in the illustrated embodiment is composed of a fixed seat back 203 on the right-hand side, and a pulldown seat back 204 on the left-hand side including an armrest 205 at a central portion of seat back 202. The fixed seat back 203 and the pulldown seat back 204 are constructed such that the pulldown seat back 204 can be pulled down about a hinge at its lower end toward the interior of the passenger compartment, with a boundary line 204b formed by a right side edge of the armrest 205.

The left-hand side pulldown seat back 204 forms a closure apparatus which is similar to the above-described lid used for opening and closing the communication opening of the armrest-through passageway structure.

In this embodiment, a locking mechanism 61 and a push knob 51 are provided on a top 204d of the central portion located near a headrest 204c of the pulldown seat back 204.

Figure 8:
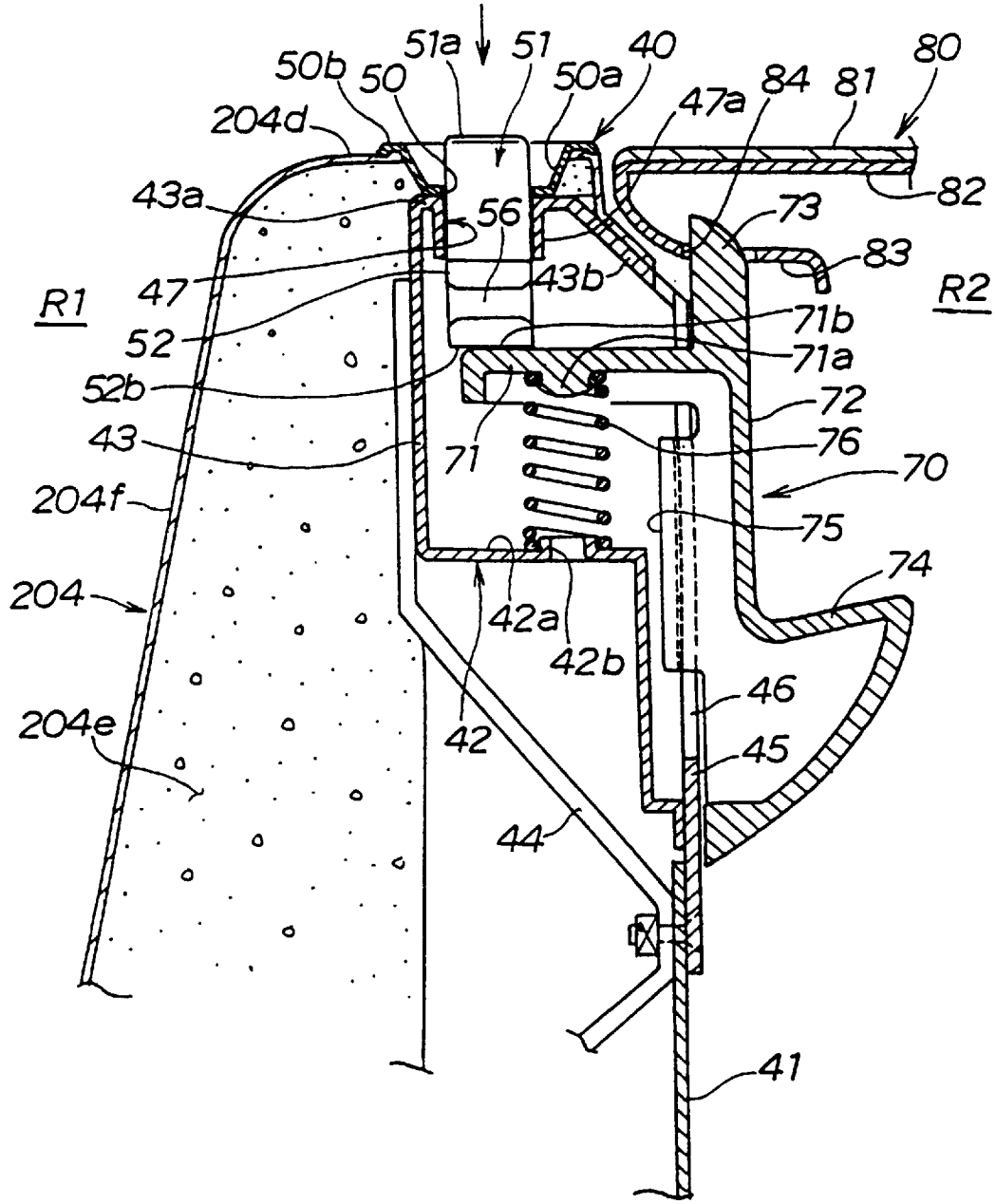
FIG. 8 is an enlarged vertical cross-sectional view of a locking and unlocking portion of the rear seat back.
Figure 9:
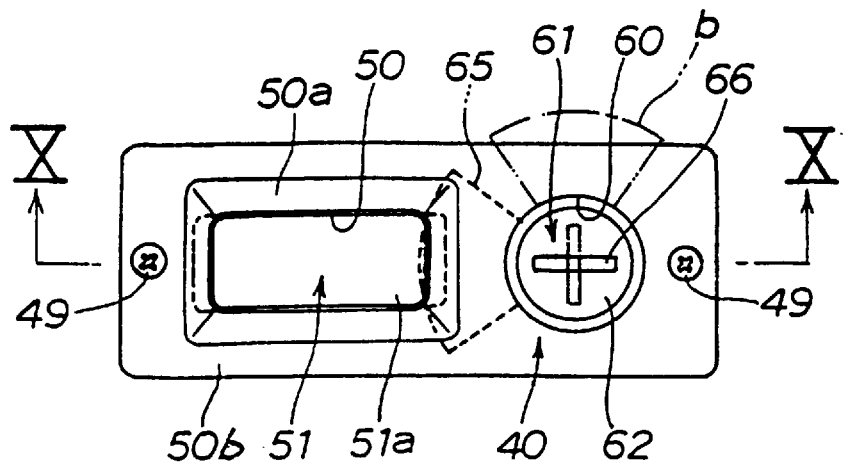
FIG. 9 is a plan view in the direction of arrow IX of FIG. 8, showing an actuating portion and a locking and unlocking device.

As shown in FIG. 8, a support frame 40 is disposed on the top 204d of the pulldown seat back 204 over an area extending from an intermediate portion to a rear end portion of the top 204d of the pulldown seat back 204, with its upper surface exposed from the top 204d. The support frame 40 has an elongated rectangular shape in the plan view as shown in FIG. 9 and extends in the widthwise direction of the pulldown seat back 204.

Disposed immediately below the support frame 40 is a holder 42 attached to an upper portion of a frame 41 secured to the back of the seat back 204. The holder 42 includes a forwardly projecting frame portion 43. The frame portion 43 has a front surface supported by the frame 41 via a generally Z-shaped support stay 44.

The frame portion 43 has a top 43a held in contact with the support frame 40. A rear end portion of the top 43a slopes down rearwardly as at 43b and terminates near a front edge of a rear tray 80 disposed on an upper portion of the back of the seat back 202.

The sloping rear end portion 43b of the top 43a has a lower end integral with a downwardly extending guide plate 45. The guide plate 45 has an upper end fixedly attached to the lower end of the sloped rear portion 43b, the lower end of the guide plate 45 being fixedly attached to an upper end of the frame 41 together with the stay 44.

The guide plate 45 has a vertically elongated guide opening 46 and, in the illustrated embodiment, the guide opening 46 is open at its upper side.

The frame 41 is placed on the back of the pulldown seat back 204. A cushioning material 204e is disposed in front of the frame 41 and covered with a covering material 204f. A rear surface (on the trunk area side) of the frame 41 is untreated.

Figure 10:
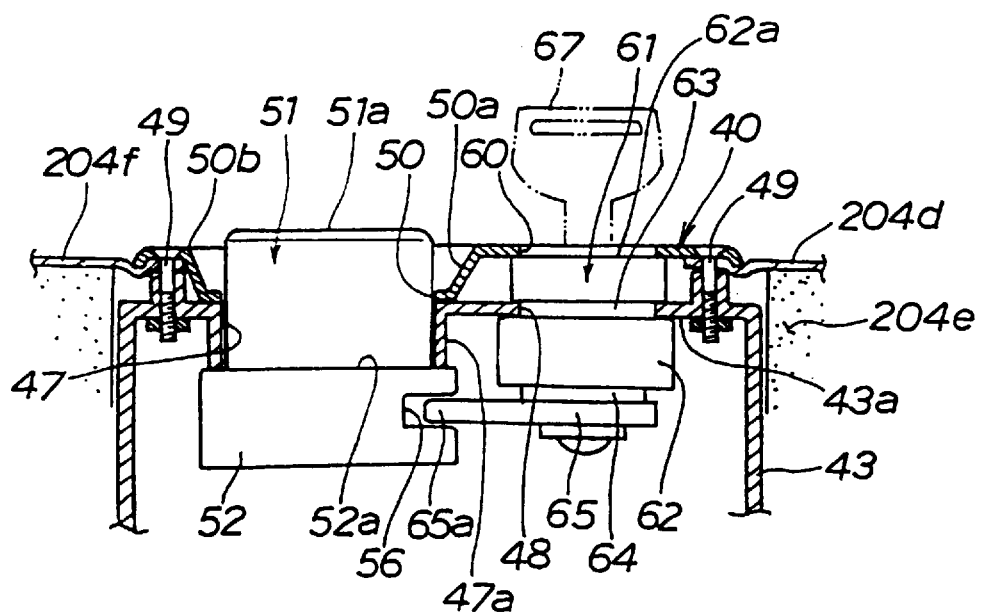
FIG. 10 is a cross-sectional view taken along line X—X of FIG. 9.

As shown in FIG. 9, the elongated rectangular support frame 40 has an elongated rectangular knob hole 50 formed with an offset toward the left-hand side of the support frame 40. The top 43a of the frame portion 43 located immediately below the knob hole 50 has a guide hole 47 which is the same in shape and size as the knob hole 50, as shown in FIG. 10. The top 43a also includes a downwardly extending tubular casing 47a extending around the guide hole 47.

The push knob 51 is vertically movably fitted in the knob hole 50 and the guide hole 47. In a normal condition, the push knob 51 is disposed with its upper half projecting upwardly from the knob hole 50.

In this embodiment, the knob hole 50 is formed in the bottom of a funnel-shaped portion 50a of the support frame 40 extending around a peripheral edge of the knob hole 50.

The funnel-shaped portion 50a has at its upper end a flat peripheral flange or land 50b. The push knob 51 has a top face 51a normally extending substantially flush with the land 50b of the funnel-shaped portion 50a. This arrangement is advantageous from the aesthetical point of view because the top face 51a of the push knob 51 does not project too much from the support frame 40.

The tubular casing 47a provided around the guide hole 47 secures a linear vertical movement of the push knob 51.

The push knob 51 has an enlarged portion 52, and a locking recess 56 formed in a side surface of the enlarged portion 52 near the center of the enlarged portion 52. The locking mechanism 61 is mounted on the support frame 40 in close juxtaposition to the push knob 51 (see FIG. 10).

As shown in FIG. 10, the locking mechanism 61 is disposed vertically, with the top face 62a of a lock body 62 lying in a plane immediately below a circular hole 60 in the support frame 40. The lock body 62 has formed at its intermediate portion a locking groove 63 by means of which the lock body 62 is fitted in a circular hole 48 formed in a portion of the top 43a of the frame portion 43.

The lock body 62 of the locking mechanism 61 includes a rotary element or rotor 64 projecting from a lower end of the lock body 62, and a lock plate 65 secured at its base portion to the rotor 64. As shown in FIG. 9, the lock plate 65 has a sector-like shape as viewed from the plane.

The lock plate 65, in a locked condition, is directed toward the push knob 51 with its front end 65a engaged with the locking recess 56 in the enlarged portion 52 of the push knob 51, as shown in FIGS. 9 and 10. As shown in FIG. 9, the lock body 62 of the locking mechanism 61 has formed in its top face a keyhole 66.

As shown in FIG. 8, a slide knob 70 is disposed on a rear surface of the guide plate 45 attached to the rear surface of the frame portion 43 located on the back of the seat back 204.

The slide knob 70 is composed of a body 72 extending vertically along the rear surface of the guide plate 45, a locking portion 73 formed at an upper end of the body 72, and an actuating portion 74 projecting rearward from a lengthwise intermediate portion of the body 72. The body 72 has a side guide portion 75 and a projection 71 projecting forward from its upper portion toward the frame portion 43, the guide portion 75 and the projection 71 being slidably fitted in the guide opening 46 in the guide plate 45 to secure stable vertical movement of the slide knob 70.

The holder 42 has formed on its bottom portion 42a a spring retainer 42b. The projection 71 of the slide knob 70 has formed on its undersurface a spring retainer 71a vertically aligned with the spring retainer 42b. A spring 76 such as a coil spring is disposed between the two spring retainers 42b and 71a.

The slide knob 70 is urged upwardly by the force of the spring 76 to keep an upper surface 71b of the projection 71 in abutment with a lower surface 52b of the enlarged portion 52 of the push knob 51. With this abutment, upward movement of the slide knob 70 is limited.

As shown in FIG. 8, the rear tray 80 is disposed behind an upper portion of the seat back 204. The rear tray 80 includes a facing material 81 and a frame 82. The frame 82 has a substantially horizontal U shape in cross section and includes a lower strip 83 extending rearward and downward from the front end of the frame 82. The strip 83 has a locking hole 84 in which the locking portion 73 of the slide knob 70 is releasably engaged.

As shown in FIG. 10, the support frame 40 is attached at its opposite ends to the top 43a of the frame portion 43 by means of two screws 49.

FIG. 8 shows the locked condition of the pulldown seat back 204 in which the locking portion 73 of the slide knob 70 is engaged in the locking hole 84 of the rear tray 80 to lock the seat back 204 in its upright position against pivotal movement in a direction toward the interior of the passenger compartment.

Hereinafter will be described a sequence of operations taken from the passenger compartment R1 to release the locked condition shown in FIG. 8 and then pull down the seat back 204 to thereby make a seat-back-through passageway between the right side of the trunk area R2 and the passenger compartment.

As shown in FIG. 10, a key 67 is inserted in the keyhole 66 and then turned in one direction (clockwise direction in the illustrated embodiment) through an angle of 90 degrees. As a result of this angular movement of the key 67, the lock body 62 including the rotor 64 is turned in the same direction, angularly moving the lock plate 65 from the locking position indicated by the broken lines in FIG. 9 to a releasing position indicated by the phantom lines b in the same figure. The lock plate 65 is thus released from the locking recess 56 of the push knob 51. Since the push knob 51 is thus released from locking engagement with the lock plate 65, it can now be moved in a downward direction.

Figure 11:
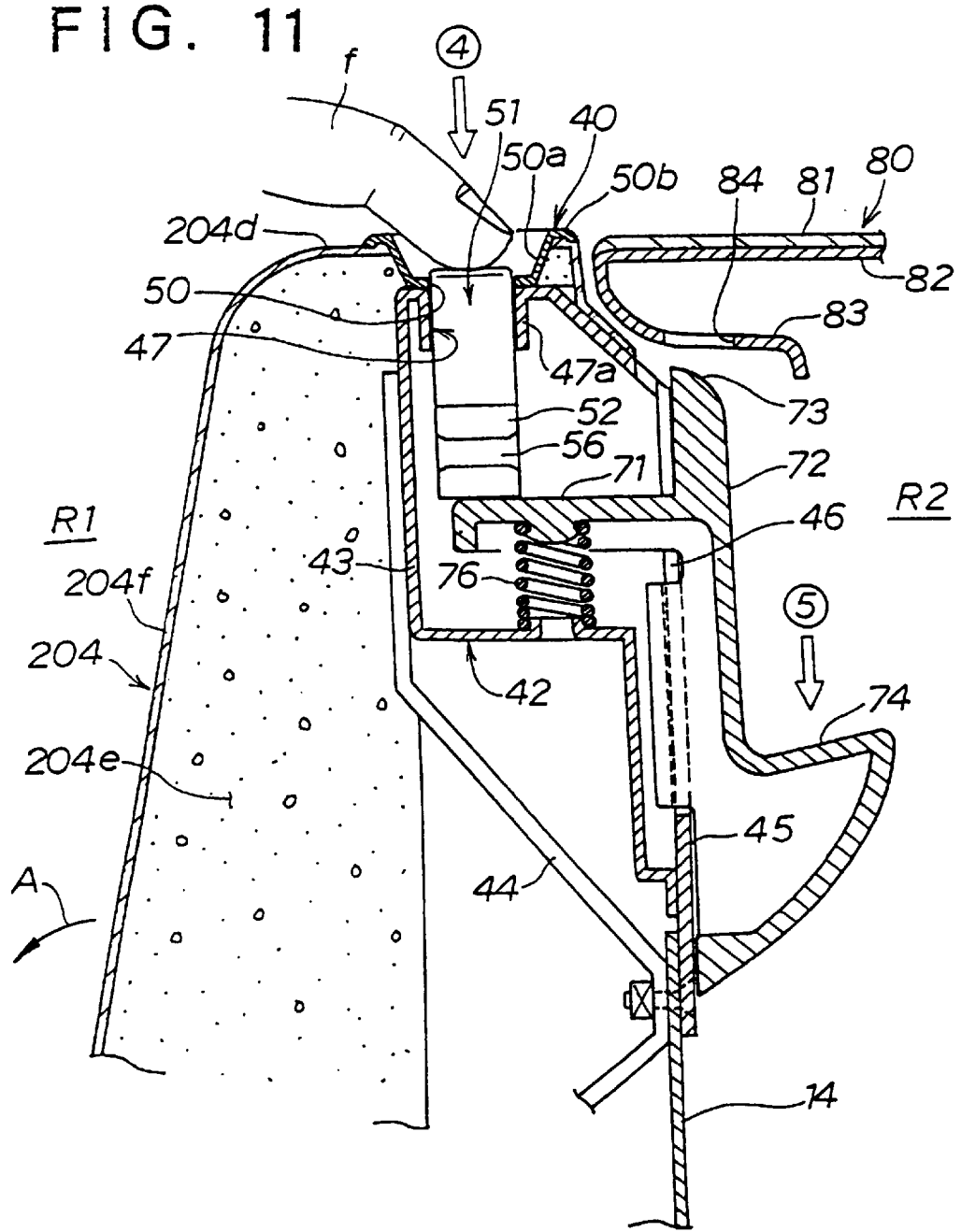
FIG. 11 is a vertical cross-sectional view similar to FIG. 8, showing the manner in which the rear seat back is unlocked and opened from the interior of the passenger compartment.

The push knob 51 is lowered by depressing it with a finger f as shown in FIG. 11. In this instance, since a lock on the push knob 51 against its downward movement is already released as described above, the push knob 51 moves downward against the force of the spring 76 disposed below the projection 71 of the slide knob 70 and, at the same time, it lowers the projection 71 of the slide knob 70 in the direction of the arrow indicated by encircled numeral 4 shown in FIG. 11.

In conjunction with this downward movement of the push knob 51, the slide knob 70 moves downward as indicated by the arrow denoted by encircled numeral 5 in FIG. 11 with the result that the locking portion 73 at the upper end of the slide knob 70 is released from the locking hole 84 of the rear tray 80.

Since the interlocking engagement between the locking portion 73 at the upper end of the slide knob 70 and the locking hole 84 of the rear tray 80 is thus released, the seat back 24 is now placed in an unlocked condition in which the seat back 204 can be pulled down toward the passenger compartment R1 side as indicated by the arrow A shown in FIG. 11.

Figure 13:
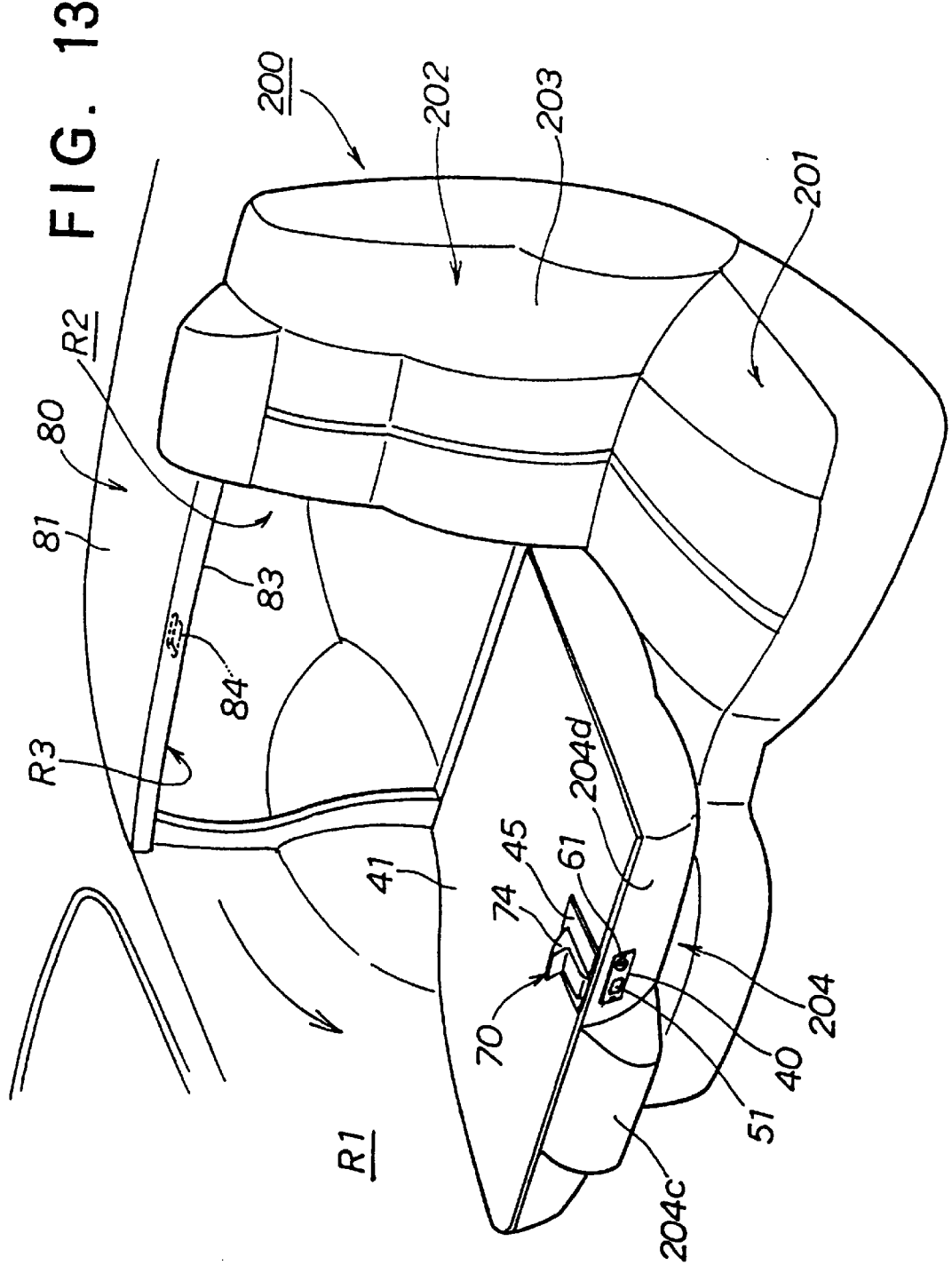
FIG. 13 is a perspective view showing a trunk-through condition as viewed from the interior of the passenger compartment, in which the rear seat is pulled down and the trunk area and the passenger compartment communicate with each other.
Figure 14:
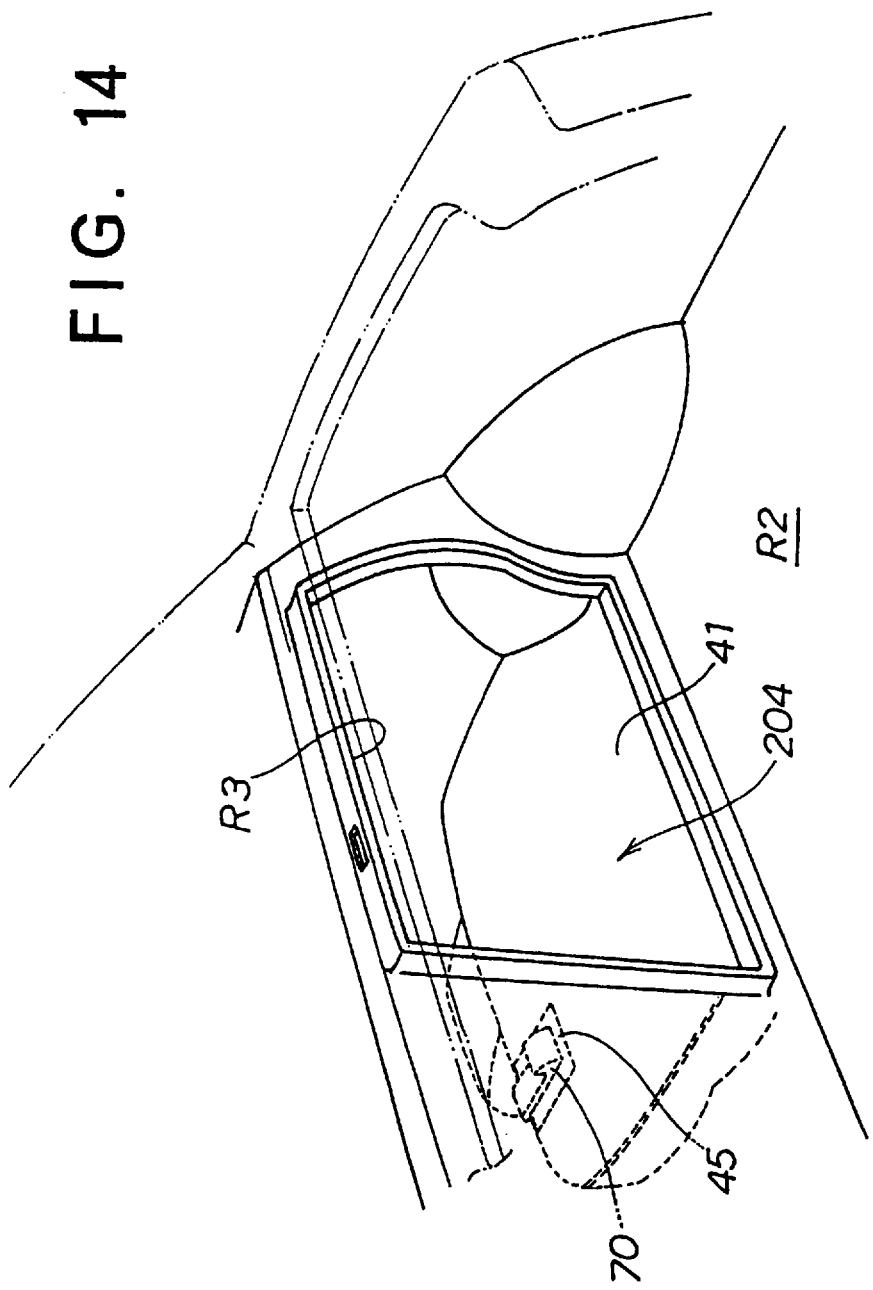
FIG. 14 is a perspective view showing the trunk-through condition as viewed from the trunk area side, in which the rear seat is pulled down and the trunk area and the passenger compartment communicate with each other.
Figure 15:
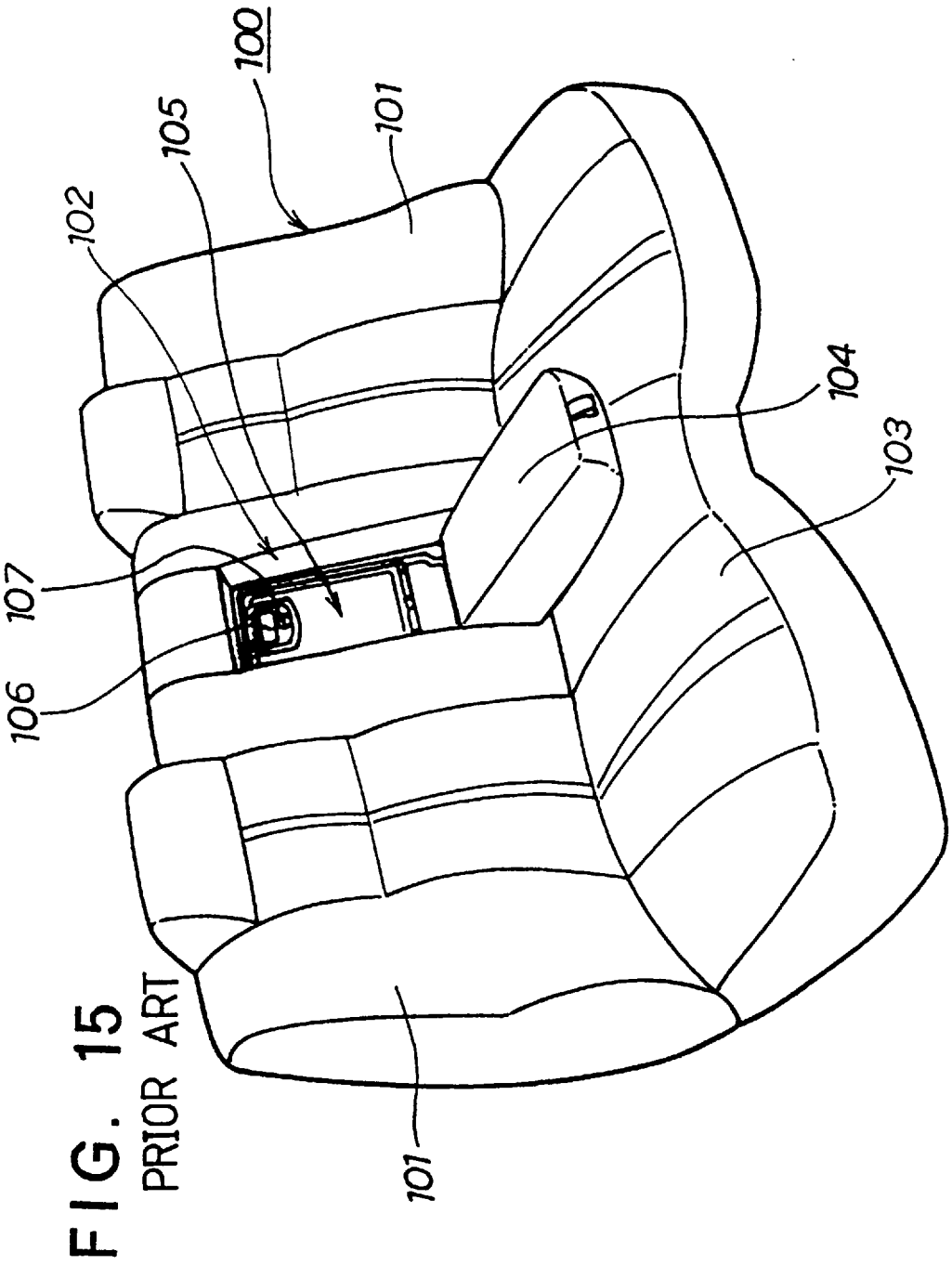
FIG. 15 is a perspective view of a rear seat of an automobile provided with a conventional lid.

As a result of this pulldown movement of the seat back 204, the passenger compartment R1 and the trunk area R2 communicate with each other via an opening R3 which makes a seat-back-through passageway between the passenger compartment R1 and the trunk area R2, as shown in FIGS. 13 and 14. A long article can, therefore, be placed in such a way as to allow it to extend from the trunk area R2 into the passenger compartment R1 through the opening R3.

Figure 12:
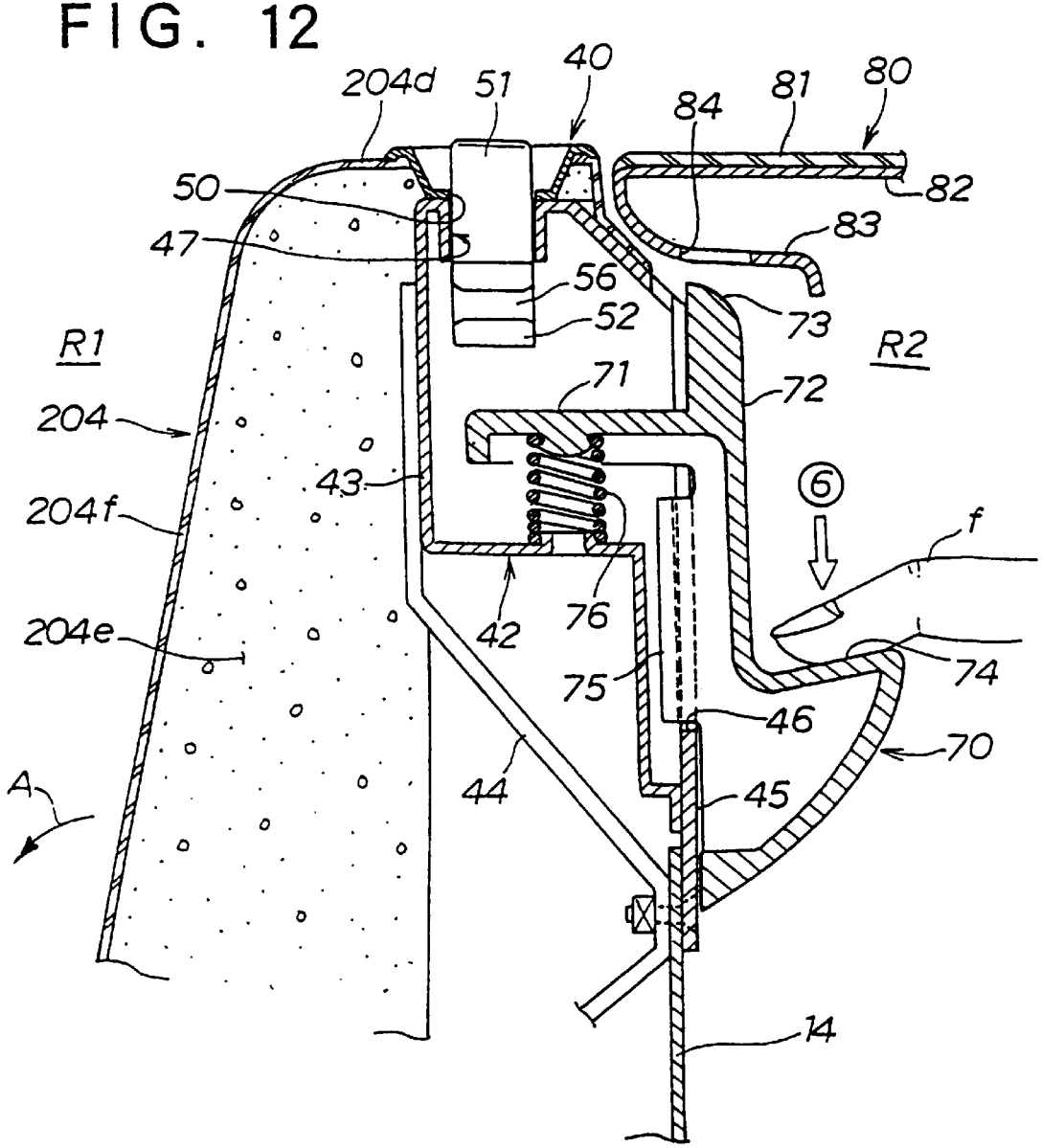
FIG. 12 is a vertical cross-sectional view similar to FIG. 8, illustrative of the manner in which the rear seat back is opened from the interior of the trunk area.

A sequence of operations taken from the trunk area R2 side to unlock the seat back 204 will be described below with reference to FIG. 12.

First, the actuating portion 74 of the slide knob 70 is lowered by depressing it with a finger f. In this instance, since the slide knob 70 is not interlocked with the locking mechanism 61 and the push knob 51, the slide knob 70 can be lowered independently without regard to the locking mechanism 61 and the push knob 51.

Upon depression of the actuating portion 74, the slide knob 70 is lowered against the force of the spring 76, as indicated by the arrow denoted by encircled numeral 6 during which time the slide knob 70 is stably guided by the guide opening 46.

With this downward movement of the slide knob 70, the locking portion 74 at the upper end of the slide knob 70 is retracted from the locking hole 84 in the rear tray 80 whereupon the seat back 204 is released from locking engagement with the rear tray 80.

Accordingly, the rear seat back 204 can be pulled down to open the opening R3, as shown in FIGS. 13 and 14, so that the passenger compartment R1 and the trunk area R2 communicate with each other via the opening R3. In this condition, a long article can be placed in such a way as to allow it to extend from the trunk area R2 into the passenger compartment R1 through the opening R3.

Thus, the operator is able to perform a seat-back-releasing operation from the trunk area R2 side without returning to the passenger compartment R1, and subsequently push down the seat back 204 to open the opening R3, thereby making a seat-back-through passageway between the passenger compartment R1 and the trunk area R2.

During that time a downward movement of the push knob 51 is precluded because the lock plate 65 is engaged with the locking recess 56 in the push knob 51.

As will be understood from the foregoing description, even when the seat back is left unlocked due to oversight of the operator, and the operator finds the locked condition of the seat back after the trunk area is opened, the operator is still able to achieve a seat-back-opening operation from the trunk area side.

Due to miscalculation of the size of an article, the operator may occasionally find it impossible to put the article in the trunk area after the trunk is opened, in which instance, the seat back can be opened to thereby store the article. Thus, the operator can meet the requirement simply by opening the seat back from the trunk area side without returning to the passenger compartment to unlock the seat back.

It will be appreciated that a seat-back-opening operation from the passenger compartment is impossible to achieve unless the lock-releasing operation is performed in advance. Another person cannot open the seat back except if he or she has a key. According to the second embodiment of the invention, it is possible to provide a seat-back-through passageway structure with greatly improved manipulability when the seat back is opened, is able to preclude the operator from taking unnecessary action, and can be handled with utmost ease.

By virtue of a combination of the push knob which is operative under the control of the locking mechanism and operatively interlocked with the slide knob, and the slide knob which is located on the trunk room side and capable of being depressed without regard to the push knob, the second embodiment is simple in construction and reliable in operation.

In the second embodiment just described, the locking mechanism, push knob, slide knob and the like mechanism are disposed on the seat back side. However, these parts and mechanisms may be disposed on the rear tray 80 side. Such a change in arrangement can be readily achieved at the user's option.

As described above, according to the present invention, there is provided a closure apparatus adapted to be opened and closed to make and block a communication between the passenger compartment and the trunk area, wherein the closure apparatus is equipped with lock means capable of being locked and unlocked from the passenger compartment side, and opening means disposed on the trunk area side and capable of opening and closing the closure apparatus without regard to a locked or unlocked condition of the lock means. As a result, the closure apparatus can be opened from the trunk area side without releasing the lock means in advance, whereby a useful trunk-through passageway is provided while maintaining the antitheft security.

The closure apparatus according to the first embodiment is comprised of a lid disposed behind a pulldown armrest located at a central portion of the rear seat. While the armrest is in its flat recumbent position, the lid is operated to open and close a communication opening to make an armrest-through passageway between the passenger compartment and the trunk area. From the passenger compartment side, the armrest-through passageway can be formed by first releasing a lock on the lid and then opening the lid. From the trunk area side, the armrest-through passageway can be formed without requiring any operation taken from the passenger compartment side.

The closure apparatus according to the second embodiment is comprised of a pulldown rear seat capable of being pulled down and pushed up to make or block communication between the passenger compartment and the trunk area. When the rear seat is pulled down, a rear-seat-through passageway is formed, communicating the passenger compartment and the trunk area. From the passenger compartment side, the rear-seat-through passageway can be formed by releasing a lock on the pulldown rear seat and then pulling down the rear seat. On the other hand, from the trunk area side, the rear-seat-through passageway can be formed without requiring any action taken from the passenger compartment side.

Obviously, various minor changes and modifications of the present invention are possible in the light of the above teaching. It is therefore to be understood that within the scope of the appended claims the invention may be practiced otherwise than as specifically described.

I claim:

1. Closure apparatus for providing and blocking communication between a passenger compartment and a trunk of a vehicle, said closure apparatus comprising:

a seat and frame assembly secured to said vehicle wherein communication is formable between said passenger compartment and said trunk;

a closure member for opening and closing said communication;

a lock mechanism for said closure member capable of being locked and unlocked through a locking and unlocking action from said passenger compartment; and opening mechanism in said trunk capable of allowing said closure member to be moved to open and close said communication independent of whether said lock mechanism is locked or unlocked.

2. The closure apparatus according to claim 1, wherein said seat and frame assembly includes a rear seat and an armrest disposed at a central portion of the rear seat, said closure member being a lid body adapted to open and close communication interconnecting the passenger compartment and the trunk when the armrest is pulled down to a horizontal recumbent position.

3. The closure apparatus according to claim 1, wherein said closure member is a rear seat back capable of being pulled down and pushed up to provide and block, respectively, the communication between the passenger compartment and the trunk.

4. Closure apparatus for providing and blocking communication between a passenger compartment and a trunk of a vehicle, said closure apparatus comprising:

a seat wherein said passenger compartment is on a passenger compartment side of said seat and said trunk is on a trunk side of said seat;

a lid frame having a locking hole;

a lid body supported by and moveable with respect to said lid frame so as to allow or block communication between the passenger compartment and the trunk, said lid body with an upper portion and having a knob retainer at the upper portion thereof, said knob retainer having a bottom and a guide hole formed therein;

a locking mechanism disposed on the upper portion of said lid body at a position below said knob retainer and capable of being locked and unlocked from the passenger compartment side;

a first slide knob disposed to be actuated from the passenger compartment side and having a leg piece extending downwardly through said guide hole of said knob retainer and a locking projection projecting toward the trunk side, said first slide knob being capable of being depressed when said locking mechanism is unlocked; and a second slide knob disposed on the trunk side and engageable by said locking projection to be movable downwardly in conjunction with downward movement of said first slide knob to disengage locking engagement between a portion of said second slide knob and said locking hole, wherein when said second slide knob is depressed from the trunk side, said locking engagement between said portion of said second slide knob and said locking hole of said lid frame is released regardless of whether said locking mechanism is locked or unlocked.

5. The closure apparatus according to claim 4, wherein said second slide knob includes a locking projection projecting toward said passenger compartment side, and further includes a torsion spring acting between the upper portion of said lid body and the locking projection of said second slide knob to urge said second slide knob upwardly.

6. The closure apparatus according to claim 4, wherein said first slide knob includes a first actuating portion projecting toward the passenger compartment side, and said second slide knob includes a second actuating portion projecting toward the trunk side.

7. Closure apparatus for providing and blocking communication between a passenger compartment and a trunk of a vehicle, said closure apparatus comprising:

a turndown seat wherein, when said turndown seat is upright, said passenger compartment is on a passenger compartment side of said turndown seat and said trunk is on a trunk side of said turndown seat, said turndown seat allowing or blocking communication between said passenger compartment and said trunk;

a frame having a locking hole;

a frame portion secured to said turndown seat and having a guide hole at an upper end thereof;

a locking mechanism capable of being locked and unlocked from the passenger compartment side;

a push knob received in said guide hole of said frame portion in such a way as to allow it to be actuated from the passenger compartment side and capable of being depressed when said locking mechanism is unlocked, said push knob having a lower end face; and a slide knob disposed on a trunk side and having a locking portion releasably held in locking engagement with said locking hole, said slide knob having a projection for abutment with the lower end face of said push knob so that said slide knob is movable downwardly in conjunction with the downward movement of said push knob, so as to disengage said locking engagement between said locking portion and said locking hole when said locking mechanism is unlocked and said push knob is depressed, and wherein when said slide knob is depressed from the trunk side, said locking engagement between said locking portion of said slide knob and said locking hole is released regardless of whether said locking mechanism for said push knob is in its locked or unlocked condition.

8. The closure apparatus according to claim 7, wherein said projection of said slide knob extends toward the passenger compartment side and is engageable with said lower end face of said push knob, said frame portion has a bottom, and said slide knob is urged upwardly by a spring acting between said projection and said bottom of said frame portion.

9. The closure apparatus according to claim 7, wherein said slide knob further has an actuating portion projecting toward the trunk side.

* * * * *